US012705934B1

(12) United States Patent

Herron et al.

(10) Patent No.: US 12,705,934 B1

(45) Date of Patent: Aug. 11, 2026

(54) VEHICLE DIAGNOSTIC SYSTEM AND METHOD FOR PROVIDING REPAIR RECOMMENDATIONS

(71) Applicant: Opus IVS, Inc., Dexter, MI (US)

(72) Inventors: Brian J. Herron, Dexter, MI (US); James T. Fish, Birmingham, MI (US); Thomas Winzig, Redmond, WA (US); Curt Jingle, Ocala, FL (US); Frank M. Terlep, Richardson, TX (US)

(73) Assignee: Opus IVS, Inc., Dexter, MI (US)

( * ) Notice: Subject to any disclaimer, the term of this patent is extended or adjusted under 35 U.S.C. 154(b) by 227 days.

(21) Appl. No.: 18/491,000

(22) Filed: Oct. 20, 2023

Related U.S. Application Data

(63) Continuation-in-part of application No. 17/515,516, filed on Oct. 31, 2021, now Pat. No. 12,380,747, which is a continuation-in-part of application No. 17/509,316, filed on Oct. 25, 2021, which is a continuation-in-part of application No. 16/449,998, filed on Jun. 24, 2019, now Pat. No. 11,257,307.

(51) Int. Cl.
*G07C 5/00* (2006.01)

(52) U.S. Cl.
CPC ............. *G07C 5/006* (2013.01); *G07C 5/008* (2013.01); *G07C 2205/02* (2013.01)

(58) Field of Classification Search
CPC ..... G07C 5/006; G07C 5/008; G07C 2205/02
USPC .......................................................... 340/438
See application file for complete search history.

(56) References Cited

U.S. PATENT DOCUMENTS

| | | | |
|---|---|---|---|
| 6,154,658 | A | 11/2000 | Caci |
| 6,728,603 | B2 | 4/2004 | Pruzan et al. |
| 6,879,894 | B1 | 4/2005 | Lightner et al. |

(Continued)

FOREIGN PATENT DOCUMENTS

| | | |
|---|---|---|
| WO | 2004092857 A2 | 10/2004 |

OTHER PUBLICATIONS

Article entitled "Remote Vehicle Diagnostic System Using Mobile Handsets" by Doo-Hee Jung, Gu-Min Jeong, and Hyun-Sik Ahn, understood to be from the proceedings of the Jun. 2006 International Conference on Wireless Networks, ICWN 2006, Las Vegas, Nevada.

(Continued)

*Primary Examiner* — Eric Blount

(74) *Attorney, Agent, or Firm* — Gardner, Linn, Burkhart & Ondersma LLP

(57) ABSTRACT

A method and system for generating a repair report for a vehicle, including a computer device and a report generation tool. The computer device receives vehicle and issue information comprising diagnostic data, vehicle information, and/or issue information related to the vehicle. The report generation tool is coupled to the computer device. The computer devices sends the vehicle/issue information to the report generation tool. The report generation tool generates a prompt for a large language model based on the vehicle/issue information. The large language model generates a repair report defined by the prompt. The computer device receives and reviews the repair report and inputs additional vehicle/issue information to the report generation tool. The large language model generates a revised repair report as defined by the repair report and the additional vehicle/issue information.

21 Claims, 9 Drawing Sheets

(56) References Cited

U.S. PATENT DOCUMENTS

| | | | | |
|---|---|---|---|---|
| 6,956,501 | B2 | 10/2005 | Kitson | |
| 7,092,803 | B2 | 8/2006 | Kapolka et al. | |
| 7,373,226 | B1 | 5/2008 | Cancilla et al. | |
| 7,502,672 | B1 | 3/2009 | Kolls | |
| 7,519,458 | B2 | 4/2009 | Buckley | |
| 7,532,962 | B1 | 5/2009 | Lowrey et al. | |
| 7,584,030 | B1 | 9/2009 | Graham | |
| 7,786,851 | B2 | 8/2010 | Drew et al. | |
| 7,840,812 | B1 | 11/2010 | Levenberg | |
| 7,928,837 | B2 | 4/2011 | Drew et al. | |
| 8,190,322 | B2 | 5/2012 | Lin et al. | |
| 8,259,936 | B2 | 9/2012 | Mahalingaiah | |
| 8,306,687 | B2 | 11/2012 | Chen | |
| 8,339,254 | B2 | 12/2012 | Drew et al. | |
| 8,352,577 | B2 | 1/2013 | Martone | |
| 8,589,018 | B2 | 11/2013 | Sarnacke | |
| 8,638,207 | B2 | 1/2014 | Drew et al. | |
| 8,688,313 | B2 | 4/2014 | Margol et al. | |
| 8,909,416 | B2 * | 12/2014 | Chen | G06F 17/00 701/33.3 |
| 8,918,245 | B2 | 12/2014 | Dewhurst et al. | |
| 9,430,884 | B2 | 8/2016 | Drew et al. | |
| 9,530,255 | B2 | 12/2016 | Drew et al. | |
| 9,563,988 | B2 | 2/2017 | Drew et al. | |
| 9,646,130 | B2 | 5/2017 | Drew et al. | |
| 10,013,816 | B2 | 7/2018 | Nassar et al. | |
| 10,055,906 | B1 * | 8/2018 | Fournier | F01N 11/00 |
| 10,146,521 | B2 | 12/2018 | West et al. | |
| 10,181,225 | B2 | 1/2019 | Liebl et al. | |
| 10,282,924 | B2 | 5/2019 | Drew et al. | |
| 10,414,277 | B1 | 9/2019 | Herron et al. | |
| 10,445,953 | B1 | 10/2019 | Herron et al. | |
| 10,692,050 | B2 * | 6/2020 | Taliwal | G06V 10/82 |
| 10,706,645 | B1 | 7/2020 | Herron et al. | |
| 10,719,813 | B1 | 7/2020 | Beckmann et al. | |
| 10,748,356 | B1 | 8/2020 | Herron et al. | |
| 11,062,534 | B2 | 7/2021 | Jingle et al. | |
| 11,107,306 | B1 * | 8/2021 | Knuffman | G06Q 40/08 |
| 11,210,869 | B2 | 12/2021 | Balan | |
| 11,455,841 | B1 * | 9/2022 | Brunda | G07C 5/0808 |
| 11,580,800 | B2 * | 2/2023 | Ghosh | G07C 5/008 |
| 11,640,587 | B2 * | 5/2023 | Rozint | G06Q 10/06316 705/305 |
| 11,834,056 | B2 | 12/2023 | Patnala | |
| 12,236,733 | B2 * | 2/2025 | Singh | G06Q 30/0206 |
| 2001/0056544 | A1 | 12/2001 | Walker | |
| 2003/0001720 | A1 | 1/2003 | Wade et al. | |
| 2003/0020759 | A1 | 1/2003 | Cancilla et al. | |
| 2004/0044454 | A1 | 3/2004 | Ross et al. | |
| 2004/0167689 | A1 | 8/2004 | Bromley et al. | |
| 2005/0021294 | A1 | 1/2005 | Trsar et al. | |
| 2005/0038581 | A1 | 2/2005 | Kapolka et al. | |
| 2005/0060070 | A1 | 3/2005 | Kapolka et al. | |
| 2005/0182537 | A1 | 8/2005 | Tefft et al. | |
| 2005/0240555 | A1 | 10/2005 | Wilde et al. | |
| 2005/0251304 | A1 | 11/2005 | Cancellara et al. | |
| 2006/0052921 | A1 | 3/2006 | Bodin et al. | |
| 2006/0106508 | A1 | 5/2006 | Liebl et al. | |
| 2006/0211446 | A1 | 9/2006 | Wittmann et al. | |
| 2007/0005201 | A1 | 1/2007 | Chenn | |
| 2007/0043488 | A1 | 2/2007 | Avery et al. | |
| 2007/0050105 | A1 | 3/2007 | Chinnadurai et al. | |
| 2007/0055420 | A1 | 3/2007 | Krzystofczyk et al. | |
| 2007/0073460 | A1 | 3/2007 | Bertosa et al. | |
| 2007/0185624 | A1 | 8/2007 | Duddles et al. | |
| 2007/0204215 | A1 | 8/2007 | Mueller et al. | |
| 2007/0233340 | A1 | 10/2007 | Raichle et al. | |
| 2008/0177438 | A1 | 7/2008 | Chen et al. | |
| 2008/0269975 | A1 | 10/2008 | Bertosa | |
| 2008/0280602 | A1 | 11/2008 | Ban | |
| 2008/0306645 | A1 | 12/2008 | Dewhurst et al. | |
| 2009/0062978 | A1 | 3/2009 | Picard | |
| 2009/0118899 | A1 | 5/2009 | Carlson | |
| 2009/0119657 | A1 | 5/2009 | Link, II | |
| 2009/0187976 | A1 | 7/2009 | Perroud et al. | |
| 2009/0265055 | A1 | 10/2009 | Gillies | |
| 2009/0276115 | A1 | 11/2009 | Chen | |
| 2010/0042287 | A1 | 2/2010 | Zhang | |
| 2010/0174446 | A1 | 7/2010 | Andreasen et al. | |
| 2010/0204878 | A1 | 8/2010 | Drew et al. | |
| 2010/0205450 | A1 | 8/2010 | Sarnacke et al. | |
| 2010/0262335 | A1 | 10/2010 | Brozovich | |
| 2011/0071709 | A1 | 3/2011 | Damiani et al. | |
| 2011/0112718 | A1 | 5/2011 | Claus et al. | |
| 2011/0153150 | A1 | 6/2011 | Drew et al. | |
| 2011/0276218 | A1 | 11/2011 | Dwan | |
| 2011/0313593 | A1 | 12/2011 | Cohen et al. | |
| 2012/0046826 | A1 | 2/2012 | Panko | |
| 2012/0254345 | A1 | 10/2012 | Montoya | |
| 2014/0277909 | A1 | 9/2014 | Bertosa et al. | |
| 2014/0279230 | A1 | 9/2014 | Bertosa et al. | |
| 2015/0121275 | A1 | 4/2015 | Marshall et al. | |
| 2017/0301154 | A1 * | 10/2017 | Rozint | G06Q 10/20 |
| 2019/0120946 | A1 | 4/2019 | Wheeler | |
| 2019/0304213 | A1 * | 10/2019 | Chen | G07C 5/0833 |
| 2020/0074767 | A1 | 3/2020 | Cavalli | |
| 2020/0151974 | A1 * | 5/2020 | Ghosh | G07C 5/0866 |
| 2021/0200950 | A1 * | 7/2021 | Basu | G16H 10/60 |
| 2022/0019748 | A1 * | 1/2022 | Krenz | G06F 40/10 |
| 2022/0058579 | A1 * | 2/2022 | Chong | G06Q 40/08 |
| 2022/0157088 | A1 | 5/2022 | Pham | |
| 2022/0194412 | A1 | 6/2022 | Zhang | |
| 2022/0306050 | A1 * | 9/2022 | Rich | B60S 5/00 |
| 2022/0383420 | A1 * | 12/2022 | Gilbert-Eyres | G07C 5/0808 |
| 2023/0028919 | A1 | 1/2023 | Haeusler | |
| 2023/0410366 | A1 | 12/2023 | Liang | |
| 2024/0212403 | A1 * | 6/2024 | Rozint | G07C 5/0808 |
| 2024/0403634 | A1 * | 12/2024 | Hawes | G06N 3/08 |
| 2024/0430173 | A1 * | 12/2024 | Coudert | H04W 16/18 |

OTHER PUBLICATIONS

Thesis entitled "Remote Connection of Diagnostic Tool" by Irina Elena Apetri and Ali Raza, Chalmers University of Technology, dated 2011.

* cited by examiner

VEHICLE DIAGNOSTIC SYSTEM AND METHOD FOR PROVIDING REPAIR RECOMMENDATIONS

CROSS REFERENCE TO RELATED APPLICATION

The present application is a continuation-in-part of U.S. application Ser. No. 17/515,516, filed on Oct. 31, 2021, which is a continuation-in-part of U.S. application Ser. No. 17/509,316, filed on Oct. 25, 2021, and which is a continuation-in-part of U.S. application Ser. No. 16/449,998, filed on Jun. 24, 2019, now U.S. Pat. No. 11,257,307, which are all hereby incorporated herein by reference in their entireties.

BACKGROUND OF THE INVENTION

The present invention is directed to a vehicle diagnostic system and method, and in particular to a vehicle diagnostic system that determines the presence of vehicle systems on a vehicle, such as safety systems including ADAS systems, as well as obtains additional vehicle information, and provides repair recommendation reports based on the status of the vehicle, including based on the vehicle systems with which it is equipped and on features requiring repair.

Vehicle diagnostic systems employing diagnostic scan devices or tools are used in automotive repair facilities to diagnose and repair computer-based vehicle systems, where vehicles may have differing computer-based systems depending on the configuration and options installed on the vehicle. Vehicle diagnostic scan systems may include or use one or more diagnostic software scanning programs or applications, such as applications developed by an original equipment automotive manufacturer ("OEM"), or an after-market diagnostic company. OEM diagnostic applications may include proprietary diagnostic application software exclusive to a particular OEM, and may be required for particular computer-based vehicle safety systems of a vehicle, such as for Adaptive Driver Assistance Systems ("ADAS") of a vehicle.

SUMMARY OF THE INVENTION

The present invention provides a vehicle diagnostic system, and in particular a diagnostic system that queries/scans a vehicle for vehicle data information that is read and evaluated to determine whether or not the vehicle includes, or the presence or absence, of particular vehicle safety systems, such as ADAS systems or other such safety systems, as well as other vehicle data inputs, and based thereon provides an operator with reports detailing recommended repairs and procedures for the vehicle. For example, based on a determination of the presence or absence of particular vehicle systems, such as safety systems and/or what specific safety systems are included in the vehicle, as well as diagnostic trouble codes on the vehicle, and/or damage to the vehicle, the vehicle diagnostic system of the present invention provides a customized report with repair recommendations.

In an embodiment of the vehicle diagnostic system, a method and system for generating a repair report for a vehicle includes a computer device and a report generation tool. The computer device receives vehicle and issue information that includes diagnostic data, vehicle information, and/or issue information related to the vehicle. The report generation tool is communicatively coupled to the computer device. The computer devices sends the vehicle/issue information to the report generation tool. The report generation tool generates a prompt for a large language model based on the vehicle/issue information. The report generation tool is either communicatively coupled to the large language model, or the large language model is a part of the report generation tool. The large language model generates a repair report defined by the prompt. The computer device receives and provides the repair report for review and facilities the input of additional vehicle/issue information to the report generation tool. The large language model generates a revised repair report as defined by the repair report and the additional vehicle/issue information.

In another embodiment of the vehicle diagnostic system, a method of diagnosing a vehicle electronic system and providing repair recommendations comprises providing a vehicle diagnostic system comprising a vehicle diagnostic computer tool and a report generator program, where the vehicle diagnostic computer tool is configured to operate in a mode to diagnose a vehicle, and connecting the vehicle diagnostic computer tool to a diagnostic port of a vehicle to be in communication with an electronic system of the vehicle. The method further includes reading vehicle data information of the vehicle with the vehicle diagnostic computer tool, and detecting with the vehicle diagnostic system whether particular electrical vehicle systems are present on the vehicle based on the vehicle data information. A repair recommendation report is generated using the report generator program, where the report generator program generates the repair recommendation report based on the particular electrical vehicle systems determined to be present.

According to an aspect of the invention, the reading of vehicle data information comprises obtaining diagnostic trouble codes (DTCs) reported by the electronic system, with the report generator program generating the repair recommendation report based on the DTCs reported by the electronic system. Still further, the method includes detecting with the vehicle diagnostic system electronic control units (ECUs) present in the electronic system with the vehicle diagnostic tool, including detecting whether Advanced Driver Assistance Systems (ADAS) systems are present by detecting ADAS ECUs. The method further includes determining whether any of the detected ECUs, such as ADAS ECUs, present in the electronic system reported DTCs.

In a particular embodiment the method further includes providing vehicle damage information to the vehicle diagnostic system, with the report generator program generating a repair recommendation report based on the vehicle damage information. Still further, the method may include determining the make and/or model of the vehicle, such as by way of detecting the vehicle VIN, with the report generator program generating a repair recommendation report based on the make and/or model of the vehicle.

Still further, the vehicle diagnostic system in accordance with an aspect of the present invention includes a repair information database containing repair instruction information, where the report generator program accesses the repair information database in generating the repair recommendation report. The repair information database may include repair information by make and/or model of the vehicle, and repair information by DTCs by make and/or model of the vehicle, and/or repair information by ADAS system.

A vehicle diagnostic system for providing repair recommendations for a vehicle in accordance with the present invention comprises a vehicle diagnostic computer tool configured to be operatively connected with a vehicle in order to diagnose an electronic system of the vehicle, where the vehicle diagnostic computer tool is configured to read vehicle data information of the vehicle. The vehicle diagnostic system further includes a diagnostic evaluation program configured to query the electronic system of the vehicle when the vehicle diagnostic computer tool is connected with the vehicle, with the diagnostic evaluation program operative to detect whether particular electrical vehicle systems are present on the vehicle. The system also includes a repair information database containing repair instruction information, and a report generator program configured to generate a repair recommendation report based on the vehicle data information and based on the particular electrical vehicle systems determined to be present, where the report generator program accesses the repair information database in generating the repair recommendation report.

In accordance with a particular aspect of the present information the vehicle data information comprises diagnostic trouble codes (DTCs) reported by the electronic system, and the report generator program generates repair recommendation reports based on the DTCs reported by the electronic system. Still further, the diagnostic evaluation program is configured to detect electronic control units (ECUs), such as ADAS ECUs, present in the electronic system, and the vehicle diagnostic computer tool is configured to determine whether any detected ECUs present in the electronic system reported DTCs. In a further aspect of the invention the vehicle diagnostic tool is configured to receive vehicle damage information, with the report generator program generating repair recommendation reports based on the vehicle damage information.

The vehicle diagnostic system of the present invention provides repair facilities and mechanics with customized repair recommendation reports based on repair data inputs particular to a vehicle requiring repairs, where the repair data inputs may include determining the presence of any ADAS systems and associated ECUs on the vehicle, determining the reported diagnostic trouble codes (DTCs) of the vehicle and ADAS systems, as well as inputs related to any physical damage to the vehicle. Based on the inputs, a report generator program of the system may access one or more databases for providing focused repair recommendations, such as in the form of a report, based on the status and condition of the particular vehicle. The ability of the system to determine whether the vehicle under test is equipped with particular vehicle systems, such as ADAS ECUs, allows the system to provide specific repair recommendations for the ADAS systems that require repair, such as systems that have been damaged in a collision or are reporting DTCs. The vehicle diagnostic system of the present invention queries the vehicle electronic system to determine the reported DTCs and detect ECUs, such as ADAS ECUs, and provides a repair recommendation report to a mechanic, where the repair report may be provided on a screen or as a file to a vehicle diagnostic computer tool used by the mechanic to determine the reported DTCs and detect ECUs. In particular, the system may utilize information regarding damage to the vehicle as an input to provide customized repair recommendations thereon, including to advise the mechanic of potential repairs to ADAS ECUs that may be present on the vehicle but not detected due to the damage to the vehicle. The system thus provides a consolidated means for a mechanic to determine the issues requiring repair attention on a vehicle, as well as obtain the repair recommendations, such as work instructions and operational steps for servicing and calibrating the vehicle systems, including ADAS systems. These and other objects, advantages, purposes and features of this invention will become apparent upon review of the following specification in conjunction with the drawings.

DESCRIPTION OF THE PREFERRED EMBODIMENTS

Figure 1:
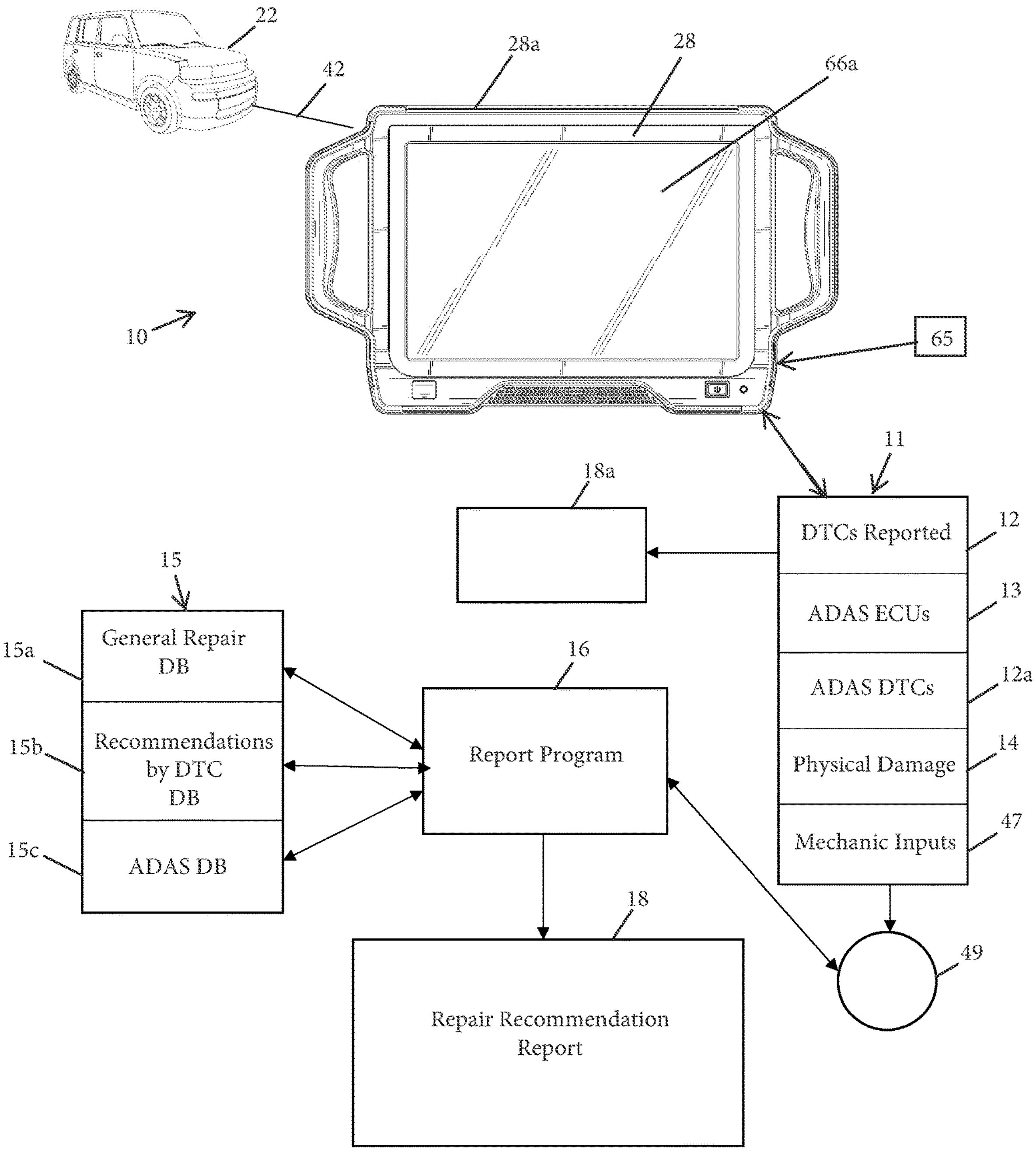
FIG. 1 is a diagram of a system and method of providing a user with service recommendations via a vehicle diagnostic system in accordance with an aspect of the present invention.
Figure 2:
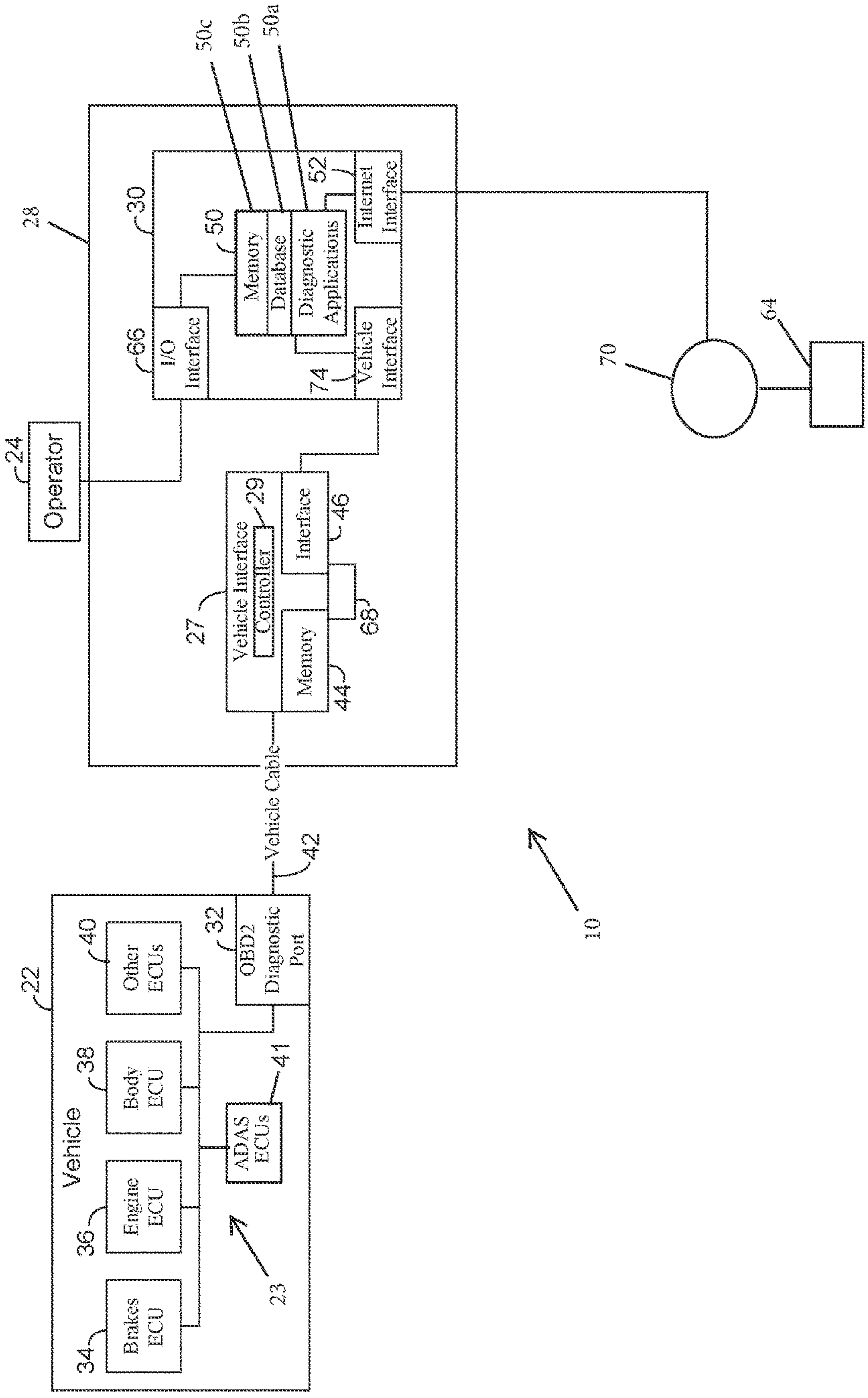
FIG. 2 is a block diagram of a vehicle diagnostic system in accordance with the present invention shown in relation to a vehicle.

The present invention will now be described with reference to the accompanying figures, wherein the numbered elements in the following written description correspond to like-numbered elements in the figures. A vehicle diagnostic system 10 for use with a vehicle 22 is shown for use by a user such as a mechanic or operator 24, such as in an automotive repair facility. System 10 is illustrated in FIGS. 1 and 2 as including a vehicle diagnostic tool 28, which as discussed in more detail below, is used to obtain various repair data inputs 11, such as vehicle data information from the electronic system 23 of vehicle 22, including reported diagnostic trouble codes (DTCs) as DTC inputs 12 that are reported by the electronic system 23, and determining whether and what safety systems are present on the vehicle, including Advanced Driver Assistance Systems (ADAS systems), such as the determined ECUs including ADAS ECUs present on vehicle 22 that are illustrated as inputs 13. System 10 may further obtain additional information regarding vehicle 22, such as damage information inputs 14 related to whether and what type of damage may exist on vehicle 22. Based on the various repair data inputs 11, system 10 utilizes a repair information database 15 and report generator logic program 16 to provide repair recommendation reports 18 to the mechanic 24, such as may be displayed on tool 28, where the reports 18 provide specific guidance to the mechanic 24 on servicing vehicle 22. System 10 thus operates as a repair recommendation wizard to provide recommendations and/or instructions to the mechanic 24 to repair vehicle 22, including based on the particular electronic modules configured on vehicle 22 and in view of any particular damage that may be present on vehicle 22.

Vehicle diagnostic tool 28 in the illustrated embodiment includes a housing 28*a* containing circuitry, hardware and software, such as a vehicle interface module 27 coupled with a computer module 30. In use, tool 28 is connected with vehicle 22 by operator 24, such as by connecting to an on-board diagnostic ("OBD") diagnostic port 32 of the vehicle 22 in order to diagnose the electronic system 23 of vehicle 22, including various vehicle electronic control units (ECUs), such as an engine ECU 34, body ECU 36, brakes ECU 38, and/or other ECUs 40, including ADAS ECUs 41, and including other electronic parts and components of vehicle 22. Tool 28 connects with port 32, such as via vehicle cable 42. Vehicle diagnostic tool 28 includes a controller 29, such as in the form of a processor or microprocessor and interface circuitry to facilitate communication between the ECUs and tool 28, with tool 28 including a database of vehicle protocols found in a local memory 44 that allow communication with the ECUs of various makes and models of vehicles. Vehicle diagnostic tool 28 additionally includes interfaces 46, 71 for communication between interface module 27 and computer module 30, where computer module 30 additionally includes a controller and memory. As understood from FIG. 2, vehicle diagnostic tool 28 may be connected to a remote computer, such as a server 64, such as by an Internet 70 connection.

Figure 3:
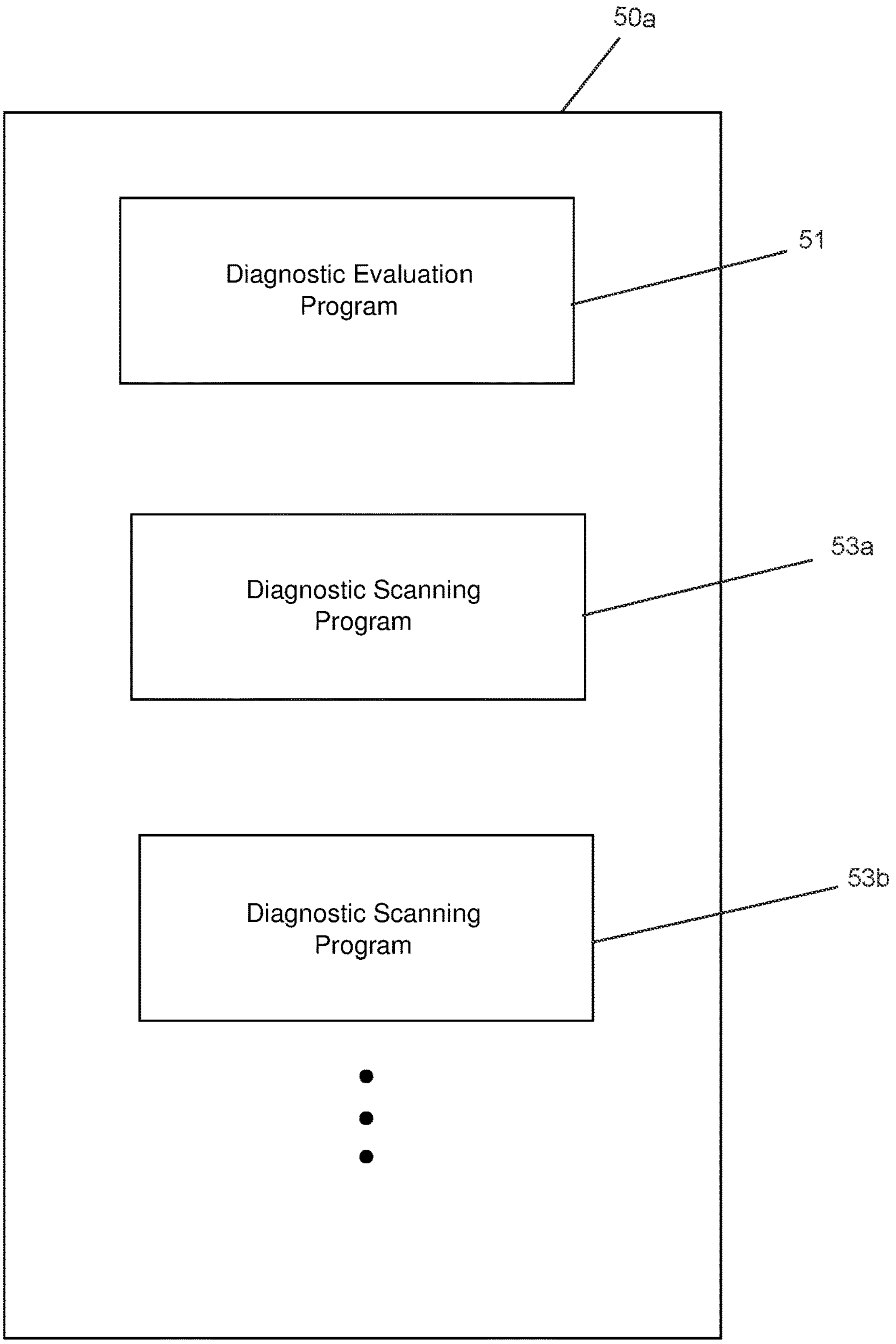
FIG. 3 is a block diagram of diagnostic applications of the vehicle diagnostic system of FIG. 1.

Vehicle diagnostic system 10 may be configured to be selectively operable in one of a plurality of different modes, whereby a technician may use the diagnostic tool 28 for vehicle maintenance, diagnosis, programming and repair as needed. In accordance with an embodiment of the present invention, system 10 includes diagnostic applications 50*a*, including a diagnostic evaluation program application 51 (FIG. 3) for querying/scanning the vehicle 22 to read vehicle data information regarding the particular ECUs that are present on the vehicle, with the vehicle data information being analyzed or parsed to determine the particular vehicle systems provided on the vehicle based on the particular ECUs that are detected. In particular, system 10 determines whether vehicle 22 includes particular safety systems, such as any ADAS systems based on the particular ECUs that are detected. Tool 28 additionally obtains any diagnostic trouble codes (DTCs) as DTC inputs 12 reported from the electronic system 23 of vehicle 22.

In the illustrated embodiment vehicle diagnostic tool 28 includes one or more commercially available diagnostic application scanning programs 53*a*, 53*b* that are configured for use with the specific vehicle 22 and may be used depending on the vehicle systems present on vehicle 22. Although shown as having two diagnostic application programs 53*a*, 53*b*, it should be appreciated that system 20 may include more than two such programs available for use with a given vehicle 22. Interface module 27 may be configured as an SAE standard J2534 device, such as a device compliant with the J2534-2 standard, or as an ISO compliant or other standard compliant device for supporting and enabling communication with the electronic systems of a vehicle.

As illustrated in FIG. 2, the diagnostic application scanning programs 53*a*, 53*b* are stored in a memory 50. An exemplary diagnostic application scanning program comprises a program provided by an automotive manufacturer or by a company that supplies diagnostic application programs, such as Snap-On Incorporated, with the diagnostic application scanning tool configured to enable the reading and reporting of fault codes in the electronic system of the vehicle such as may be located in ECUs of the vehicle. In practice, memory 50 may include multiple diagnostic application programs, each for use with various makes and/or models of vehicles to enable diagnosing and programming of ECUs via vehicle interface module 27, including depending on the particular vehicle systems/ECUs on the vehicle installed by the OEM based on the customer's selection of vehicle options. Alternatively and/or additionally, memory 50 may include diagnostic application programs that may be used with multiple variations of vehicles. Vehicle interface module 27 and computer module 30 are thus cooperatively used for querying/scanning and diagnosing ECUs of vehicle 22, including for accessing error codes generated by the ECUs for assessing and diagnosing operational and performance related aspects of the vehicle 22.

It should be appreciated that different vehicles may be equipped with different ECUs, including that some vehicles of the same make/model may have different or additional ECUs when compared to other vehicles of the same make/model. For example, a given vehicle may be sold with or without advanced driver-assistance systems (ADAS), such as adaptive cruise control, lane departure warning, parking assistance, blind spot detection, collision avoidance, forward collision warning, surround view, automatic parking, and other driver assistance systems or other vehicle options. Each ADAS subsystem may include its own additional ECUs, or an ECU may be shared for more than one ADAS feature, where such additional ECUs must be queried/scanned, accessed, and then assessed. It should be appreciated that vehicles with the additional ADAS subsystems and corresponding additional ECUs will require a more extensive scanning program that is capable of interfacing with the additional ECUs of the equipped ADAS subsystems. Correspondingly, the same vehicle make and model without additional ADAS subsystems will not have the additional ECUs.

Interfacing and interrogation with every ECU of a vehicle allows all fault codes to be ascertained. An OEM supplied diagnostic scanning program may operate to perform an in-depth scan regardless of the vehicle configuration, including whether or not the vehicle includes ADAS systems, whereby all possible ECUs for a particular model of a vehicle are routinely queried by the vehicle diagnostic system 10 whether they are actually in the vehicle 22 or not. While a proprietary manufacturer supplied scanning program may provide an assurance that all ECUs on a vehicle under test have been queried/scanned and assessed, such scanning programs are often costly, including in terms of requiring a significant length of time to operate as the scanning program methodically queries/scans for each ECU the vehicle may be equipped with, whether or not the vehicle is in fact equipped with any given ECU, as well as having a substantial financial cost as there are monetary charges associated with utilizing the proprietary scanning program, including such as costs for each use or running of the proprietary scanning program. Moreover, certain service operations are not required if a vehicle is not equipped with particular systems. For example, in the case of ADAS systems, there is no need to run service operations such as calibration procedures or scans on such systems if they are not present on a particular vehicle. In accordance with aspects of the present invention, therefore, prior to providing a mechanic 24 with repair reports 18, an evaluation may be performed to determine the vehicle systems present on the subject vehicle whereby a tailored report 18 for the vehicle 22 at issue may be provided, including based on the particular systems/ECUs present on the vehicle and/or any particular damage that occurred to vehicle 22, such as from a collision.

Accordingly, prior to providing a repair recommendation report 18 to the mechanic 24, or selecting a diagnostic scanning program 53*a*, 53*b* for use with a given vehicle, a diagnostic evaluation program 51 may initially be run to read or obtain vehicle data information related to the equipped vehicle systems on the vehicle. In one embodiment, vehicle diagnostic tool 28 includes a database 50*b* of known ECUs that may be present on a vehicle, including ECUs for ADAS systems on a vehicle. Diagnostic evaluation program 51 is run to determine the ECUs that are present on the vehicle 22, where the detected ECUs may be compared to the known ECUs identified in database 50*b* that may be present, whereby the particular ECUs present on vehicle 22 may be identified. In one embodiment, information contained within database 50*b* includes information regarding addresses within electrical system 23 for the potential ECUs of vehicle 22, where the addresses may be specified, for example, by a bit string, such as unique bit strings for the various addresses of the ECUs. For example, database 50*b* may include information regarding each possible ECU that was available for a given make and model of vehicle, such as by year, including for all potential options, including ADAS systems, including the specific ECU for each possible module and the address within electrical system 23 that such ECU is located. Diagnostic evaluation program 51 may operate to query each address of electrical system 23 at which an ECU may be present, such as by sending an inquiry signal to such addresses, where system 10 is able to confirm the presence of a given ECU for such addresses if a response signal is received from an ECU at the given address. Moreover, system 10 is able to identify the particular ECU, including whether the ECU is an ADAS ECU based on the address, which identification information may be stored in database 50*b* along with the given address. For example, each potential ECU of a given make and model of vehicle, including by year or years, may be mapped out such that database 50*b* includes the address of each ECU, and may also include the specific operation, purpose or function of the ECU, such as by part number, name, or the like. System 10 may serially query addresses of electrical system 23 to determine the presence of particular ECUs, including ADAS ECUs, or may alternatively broadcast inquiry signals to multiple or all potential addresses in parallel. Still further, rather than query each ECU within the electronic system 23, system 10 may be configured to query only for ADAS ECUs. In such a configuration database 50*b* may only contain ECU addresses for ADAS systems. System 10 may also operate to query vehicle 22 to obtain a vehicle identification number ("VIN") and, based thereon, operate to identify the potential ECUs within database 50*b* that may be present on a given vehicle. The determined ADAS ECUs 13 present on vehicle 22 are then used as a repair data input 11 for generating a recommended repair report 18, as discussed in more detail below.

As noted, in addition to determining the ECUs present in the electrical system 23, system 10 additionally obtains the reported fault codes or DTC inputs 12 that are reported in electrical system 23, such as DTCs reported by ECUs of electrical system 23. Moreover, based on system 10 determining the ADAS ECUs present on vehicle 22, system 10 is further able to determine if any of the reported DTCs are associated with such ADAS ECUs, which ADAS DTCs are noted at 12*a* in FIG. 1 as one of the repair data inputs 11.

As discussed in more detail below, based on the determined ECUs that are present on vehicle 22 and the ascertained fault codes, a customized repair recommendation report 18 may be provided to mechanic 24. It should be appreciated, however, that in the step of determining the presence of the particular ECUs on the vehicle 22, that the absence of a response signal from an ECU at a given address, such as an ADAS ECU, may mean either that the module and ECU was not present on the vehicle, i.e. it was not originally equipped with the ADAS module and associated ECUs, or that the module having such ECU has been damaged. For example, in the case of a vehicle that has been damaged, such as by a collision, it is possible that the vehicle may have been equipped with particular vehicle systems or modules having ECUs, such as ADAS ECUs, but that due to the damage to the vehicle the diagnostic evaluation program 51 may not be able to detect all of the ECUs due to the vehicle damage. For example, a vehicle may be equipped with certain exterior cameras, radar or ultrasonic sensors, or other ADAS equipment. If such components are damaged in a collision, and or associated controllers are damaged in a collision, then diagnostic evaluation program 51 may inadvertently infer that such systems were not present on vehicle when instead they are not responding or detectable due to the damage. As such, in accordance with a further aspect of the present invention, system 10 may be additionally operable to receive inputs 14 related to damaged areas of vehicle 22 whereby system 10 provides a repair recommendation report 18 that takes into consideration the damage and potential vehicle systems and associated ECUS, including ADAS systems and associated ADAS ECUs. With reference to FIG. 1, damage information inputs are noted at 14 in FIG. 1 as one of the repair data inputs 11.

Damage information inputs 14 may be provided to system 10 via one or more various sources. In one configuration, one or more images representative of the particular vehicle 22 being diagnosed may be shown on screen 66*a* of diagnostic tool 28 where, for example, based on a detected VIN, diagnostic tool 28 may display an image representative of the make, model and year of vehicle 22. The mechanic 24 may then be prompted to interact with the displayed image, such as with screen 66*a* being configured as a touchscreen, to designate or highlight on the displayed image the location or locations corresponding to any actual damage on vehicle 22. Alternatively, in another configuration system 10 may obtain digital images or photographs of the actual vehicle 22 requiring repair and, via image recognition software, determine the location or locations of damage on vehicle 22. Such digital images may be provided to system 10 from a separate camera, or for example, diagnostic tool 28 may include an integrated camera or imager, such as a CMOS imager, with which to take digital images of vehicle 22, with image recognition software residing in computer module 30, such as in memory 50. Still further, in yet another configuration system 10 may interface with a collision estimating software program, such as via an API exchange, whereby system 10 may receive a predetermined evaluation of any damage to vehicle 22, including to specific vehicle systems whereby the damaged ADAS modules are determined. For example, information regarding physical damage to a vehicle via is illustrated as being provided to diagnostic tool 28 from a collision estimating software residing on a separate computer 65 in FIG. 1. It should be appreciated that the collision estimating software may alternatively reside on diagnostic tool 28 itself, or be accessed directly via diagnostic tool 28.

In addition to the noted inputs discussed above, system 10 may also prompt the mechanic 24 to respond to questions or provide initial instructions for operating system 10, such as may be displayed on screen 66A of diagnostic tool 28, where the responses are designated as mechanic inputs 47 in FIG. 1. As noted, the prompts by diagnostic tool 28 may comprise instructions for initializing system 10 for operation, such as regarding the status of whether or not the battery of vehicle 22 is connected or disconnected. Alternatively or additionally, the prompts may be queries to the mechanic 24 to enter information regarding visible technology on the vehicle, such as external cameras, sensors or the like, which may be used as a cross check to results of the ADAS ECUs input 13.

In addition to repair information database 15 noted above and discussed in more detail below, system 10 may additionally employ a vehicle ADAS database 49, where database 49 includes information regarding all possible ADAS modules that may have been available for a given make, model and year of vehicle. For example, as noted above, diagnostic tool 28 may query electronic system 23 to obtain the VIN of vehicle 22, or the mechanic 24 may enter the VIN into diagnostic tool 28, such as a mechanic input 47. Alternatively, the mechanic input 47 may comprise the make, model and year of the vehicle 22 as a manual input entered by the mechanic 24. Based on the determined and decoded VIN and/or the make, model and year of the vehicle 22, database 49 is operable to determine what possible ADAS modules or systems may have been available for the vehicle 22. If, for example, database 49 establishes that no or certain ADAS systems were not available for a vehicle, then the report 18 generated by system 10 will not include any repair recommendations for such ADAS systems, regardless of the presence of any damage to vehicle 22 where such a system may otherwise have possibly resided. Alternatively, database 49 may establish that a given vehicle was equipped with particular systems, such as ADAS systems. System 10 may thus further determine that a particular ADAS system should be present on a vehicle 22, such as by information input by mechanic 24 or via database 49, and upon system 10 detecting or determining that one or more ECUs associated with an ADAS system do not respond or are not detected that should have been detected, system 10 may then use such information in providing repair recommendation reports 18. That is, system 10 will have determined that such an ADAS system and associated ECUs were damaged and provide repair information therefor.

Repair information database or master repair and recommendation database 15, as shown in FIG. 1, includes numerous categories of repair and recommendation instructions and information that may be provided to and/or used to provide reports 18 to mechanic 24 based on the repair data inputs 11. The categories of database 15 comprise general repair recommendation information in a sub-database 15*a* that may provide, for example, repair recommendation information based on the make, or make and model, or make, model and year, of vehicle 22, where as noted above, the make, model and/or year may be determined from decoding the VIN of the vehicle 22. The repair recommendation information contained within database 15*a* may include general repair instructions for various systems of vehicle 22, including non-ADAS systems, where the instructions may be provided by the OEM maker of vehicle 22. This can include all possible repair instructions available for vehicle 22, from which specifics may be selected in generating reports 18 based on the particulars of vehicle 22. The categories of database 15 additionally comprise a sub-database 15*b* containing repair recommendations based on DTCs where, for example, database 15*b* may include recommendations for all potential DTCs that may be possible for vehicles based on the make and model of vehicle 22, including based on the year of vehicle 22. That is, instructions may be provided for diagnosing, trouble shooting and/or repairing vehicle systems for the possible DTCs that may be reported by the electronic system 23 of vehicle 22.

Database 15 further comprises an ADAS database 15*c* that contains detailed instructions related to diagnosing, trouble shooting and/or repairing ADAS vehicle systems such as by make, model and year of vehicle, and by particular ADAS systems, including information and instructions regarding required ADAS calibrations and details for performing calibration of repaired or replaced ADAS systems and information and instructions for addressing ADAS DTCs, with such information including service procedures for ADAS systems. Database 15*c* further includes information for correlating damage to ADAS systems. For example, database 15*c* may include information related to the physical location of ADAS systems on vehicles by make, model and year. Accordingly, based on the damage information inputs 14, database 15*c* may be used to provide guidance to mechanic 24 via repair recommendation report 18 as to the possible ADAS systems that may have been present for which no ADAS ECUs were determined via inputs 13 based on the specifics of the damage information inputs 14. For example, if damage information inputs 14 indicate damage to the front end of a vehicle 22, and based on the determined VIN it is further determined that the vehicle 22 could potentially have been equipped with one or more forwardly disposed ADAS systems, such as radar, ultrasonic or camera sensors, having components at the damaged location and such as indicated via vehicle ADAS database 49, and no ADAS ECUs having addresses at the damaged location were determined via inputs 13, then system 10 may generate a report 18 for mechanic 24 providing recommendations for determining whether the vehicle was in fact equipped with such forwardly disposed ADAS systems and, if so, instructions for repairing and calibrating such ADAS systems.

As noted, database 15*c* may include ADAS calibration instructions. It should be appreciated that upon repairing and/or replacing an ADAS system or components, such as sensors including cameras, ultrasonic and radar sensors, or computer modules for such ADAS systems, that the ADAS systems must be calibrated in accordance with OEM instructions and procedures in order to ensure that the repaired or replaced systems are operating properly. Accordingly, database 15*c* may additionally include information regarding the steps required for calibration of the ADAS system, this includes instructions on the specific calibration targets to be employed, such as visual or optical targets for cameras as well as physical targets for radar and ultrasonic sensor calibration, and including instructions for positioning the targets relative to the vehicle 22, such as prior to initiating an OEM calibration operation, as well as instructions for launching the OEM calibration procedure.

The operation of system 10 to generate repair recommendation reports 18 in the illustrated embodiment is understood with reference to FIG. 1, where report generator logic program 16 operates to provide one or more repair recommendation reports 18 upon system 10 obtaining or determining the various repair data inputs 11. Based on the repair data inputs 11, as well as based on information from vehicle ADAS database 49, logic program 16 queries and/or extracts information from database 15 to generate or compile work instructions or recommendations for mechanic 24 that are provided via reports 18. For example, based on diagnostic tool 28 determining or obtaining the reported DTCs of electronic system 23, logic program 16 obtains specific work instructions or recommendations for the determined DTCs 13, including the determined ADAS DTCs 12*a*.

Accordingly, the repair recommendation report 18 includes recommendations based on the particular make and/or model and/or of vehicle 22, based on the reported DTCs of the electronic system 23 of vehicle 22, based on the determined ADAS systems equipped on vehicle 22, including any DTCs reported from the ADAS systems, and based on the presence of any physical damage to vehicle 22. Still further, the repair recommendation reports 18 may include recommended calibration service procedures for the ADAS systems.

System 10 may additionally provide a separate scan report 18*a* to mechanic 24, where the scan report 18*a* comprises a listing of all of the DTCs reported from the electronic system 23. It should be appreciated that the repair recommendation report 18 and scan report 18*a* may be displayed on the screen 66*a* of diagnostic tool 28.

In one embodiment, repair information database 15 is located remotely from the vehicle repair facility and accessed by diagnostic tool 28, such as being retained within remote server 64 and accessed via a wireless Internet connection 70. Likewise, report generator logic program 16 may also be located remotely and be accessed by diagnostic tool 28. Alternatively, report generator logic program 16 may be contained within memory of diagnostic tool 28, and operate to interface with a repair information database 15. The repair recommendations may include recommending a particular diagnostic scanning program to be used that is suited to use with the vehicle, including to expedite the vehicle scanning and avoid unnecessary time and expense associated with running a diagnostic scanning program that is not required for the vehicle. Rather, a diagnostic scanning program may be run that is not configured to query all possible ECUs that a vehicle may possibly be equipped with, such as for example not querying ECUs associated with ADAS systems that are not present on the vehicle.

In one embodiment the diagnostic evaluation program 51 obtains the vehicle VIN upon connection of system 10 with vehicle 22. As a first step, system 10 via the vehicle diagnostic tool 28 may initially acquire a vehicle identification number (VIN) associated with a vehicle under test. In an aspect of the present invention, the diagnostic tool 28 is operable to read the VIN from the vehicle 22 via its connection through the OBD2 diagnostic port 32. The vehicle VIN may then be used to determine the vehicle systems equipped on the vehicle, such as via ADAS database 49. Alternatively, for example, computer module 30 may include a database 50*b* that is operatively used to determine the vehicle systems on the vehicle based on the determined VIN, such as via a VIN database. This may include an algorithmic lookup table based on the identified VIN, such as for example where certain alphanumeric characters of the VIN identify the presence or absence of particular vehicle systems present on the vehicle, such as ADAS systems or other vehicle or safety systems. In response to the identification of the vehicle systems an appropriate diagnostic scanning program 53*a*, 53*b* may be selected for use in scanning the electrical system of the vehicle. Alternatively, the VIN for the vehicle 22 may be acquired through alternative means and directly input by the operator 24, such as by being visually examined and input via interface 66, such as by way of a keyboard or touch screen. Moreover, rather than a lookup VIN database, the system 20 may operatively algorithmically analyze selected alphanumerical characters, such as by position number in the VIN, with the system 20 recognizing based on the particular character and location the presence or absence of particular vehicle systems present on the vehicle, such as being preprogrammed. This may include, for example, an operator initially entering a make and model of a vehicle via interface 66 whereby the system 20 is preconfigured to read particular characters in particular locations of the VIN in order to determine the presence or absence of particular vehicle systems present on the vehicle.

In a further particular alternative embodiment, system 10 may query the electronic system 23 of the vehicle 22 to obtain the part numbers of all ECUs resident on vehicle 22, where the ECU part numbers are readable via interface module 27 and the connection with OBD diagnostic port 32. The ECU part numbers are then usable to determine which vehicle scanning program 53*a*, 53*b* to run. For example, database 50*b* may additionally or alternatively include an ECU part number database, where a comparison of ECU part numbers obtained via interface tool 28 with ECU part numbers in database 50*b* provides a decision as to which vehicle scanning program 53*a*, 53*b* to run. For example, upon a determination of the presence of one or more ECU part numbers associated with ADAS systems, a proprietary OEM vehicle scanning program application may be run. Alternatively, upon a determination that no ADAS systems are present on the vehicle, an aftermarket vehicle scanning program application may be run. Still further, it should be appreciated that yet other alternative vehicle scanning programs may be run depending on the specific ECUs present on the vehicle 22 under test. For example, programs may be available for vehicle configurations having particular ADAS systems that do not include other ADAS systems, whereby particular known ECUs present can be scanned while avoiding use of a diagnostic scanning program having superfluous capability and functionality.

Figure 5:
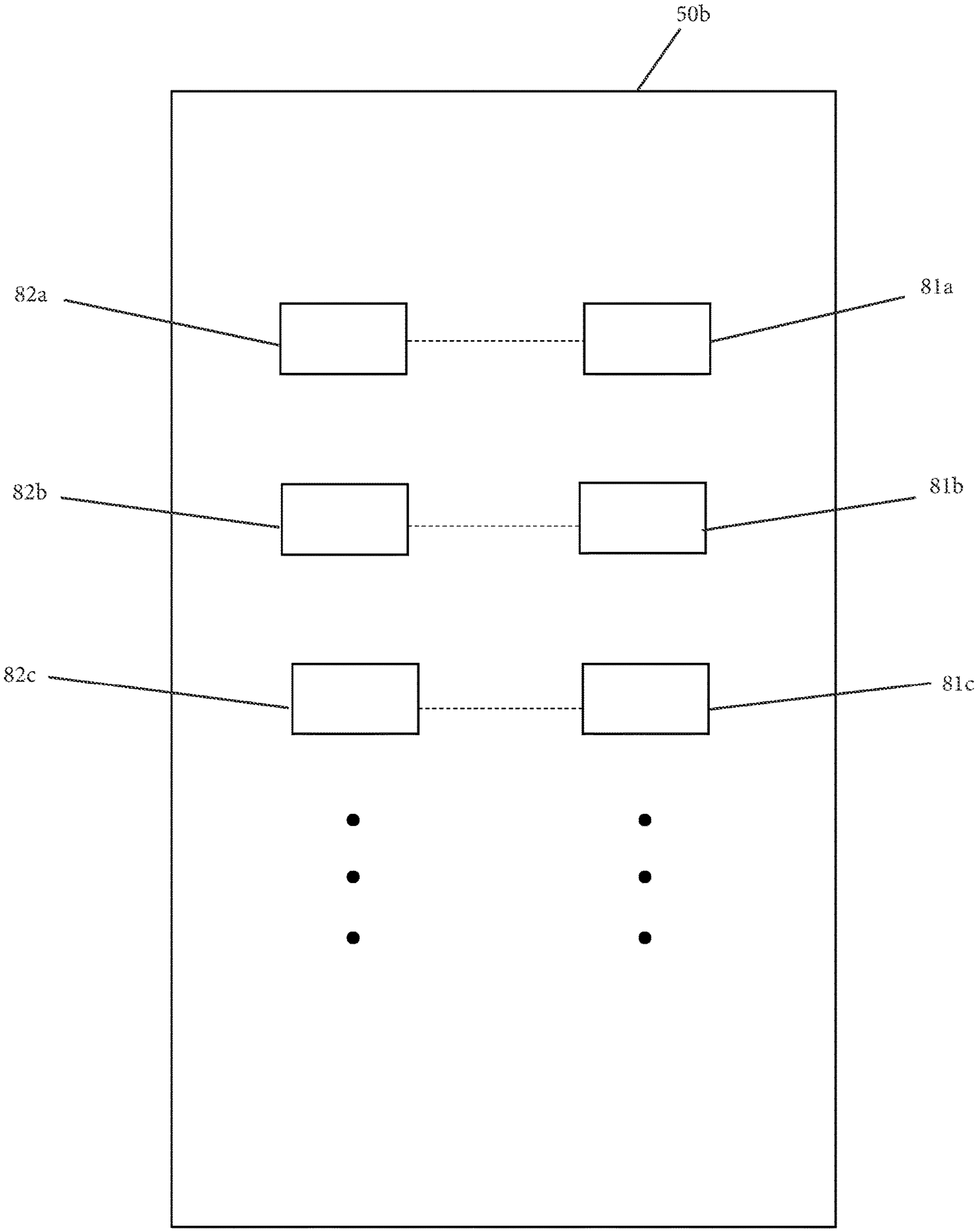
FIG. 5 discloses an exemplary database in accordance with aspects of the present invention correlating ECU part numbers to vehicle systems for a vehicle.

An exemplary embodiment of a database 50*b* configured as an ECU database is illustrated in FIG. 5. As there shown, database 50*b* includes a listing of ECU part numbers 82*a*, 82*b*, 82*c*, such as for one particular make and model of vehicle, with the ECU part numbers being correlated with vehicle systems 81*a*, 81*b*, 81*c*, where the vehicle systems 81*a*, 81*b*, 81*c* in the illustrated embodiment are ADAS systems such as a forward facing lane keeping assist system, an adaptive cruise control system, and a collision avoidance system. It should be appreciated that although database 50*b* is illustrated in FIG. 3B to include three separate ECU part numbers associated with three separate vehicle systems, in practice a vehicle may be equipped with dozens or hundreds of ECUs where by the ECU database may include numerous listings of ECU part numbers as well as numerous vehicle systems. It should be appreciated that database 50*b* may include both ECU part numbers and addresses, which may be correlated or combined together.

The vehicle database 50*b* may further comprise a VIN/ECU part number database that includes a listing of ECU part numbers associated with a given VIN. Therefore, based upon a review of the VIN database and a review of the ECU part numbers associated with the current vehicle's VIN, a selection may be made between a third party supplied scanning program or a manufacturer supplied scanning program. For example, if the VIN database reveals that a given vehicle contains one or more ECU part numbers associated with ADAS ECUs, a decision can be made to select the more comprehensive manufacturer supplied scanning program. In the alternative, if a review of the VIN database reveals that the vehicle is not equipped with ADAS ECUs, the faster and less costly third-party supplied scanning program may be utilized. Such a decision may be aided if the VIN entry in the VIN database for an ADAS equipped vehicle includes at least one part number of an ADAS ECU associated with the VIN. Alternatively, the VIN entry in the VIN database for an ADAS equipped vehicle may include some other indication in the VIN database that the VIN is associated with an ADAS equipped vehicle. Therefore, if a vehicle's VIN entry in the VIN database does not include an ADAS ECU part number or some other indication that the VIN is for an ADAS equipped vehicle, the third-party supplied scanning program may be selected.

Still further, system 20 may be configured to accept operator input to obtain vehicle data information used to select a desired diagnostic evaluation program 53*a*, 53*b* appropriate to a particular vehicle 22 under test. For example, system 10 may prompt an operator 24 to enter vehicle make and model information, such as via interface 66. System 10 may then provide step-by-step inquiries to operator 24 regarding systems installed on vehicle 22, such as whether vehicle 22 includes particular cameras at particular locations, or specifically whether vehicle 22 has particular ADAS systems.

Accordingly, system 10 instead of automatically selecting and launching a diagnostic scanning program 53*a*, 53*b* to be run after diagnostic evaluation program 51 queries vehicle electronic system 23 to determine which vehicle systems 81*a*, 81*b*, 81*c* are present on vehicle 22, or prior thereto, system 10 may instead provide repair recommendation reports 18 based on repair data inputs 11, including based on vehicle systems that have been determined to be on vehicle 22, such as based on a determination of the actual ADAS systems or ECUs present on the vehicle 24 based on the determination of the actual ECUs present on vehicle 24. Still further, the vehicle data information may include a listing of trouble or fault codes present on the ECUs, such as on the ECUs of the ADAS systems. The repair recommendation report 18 may additionally include a recommended scanning program 53*a*, 53*b* to be run, such as after completion of repairs.

System 10 may then further provide vehicle maintenance or repair instructions or recommendations to the operator 24 that are viewable on display 66*a*. Such recommendations may include an identification of which vehicle systems 81*a*, 81*b*, 81*c* may require maintenance, such as calibration or repair. For example, on a vehicle with a front radar ADAS system and front damage on the vehicle, system 10 may prompt the operator 24 to repair and calibrate the front radar system. System 10 may additionally provide instructions as to what equipment and process is required for calibration or repair of the vehicle systems. For example, system 10 may provide an identification of a particular target required for calibration of an ADAS system, where the target may comprise a visual pattern that is observed by a camera or may utilize a geometrically configured object for use with calibration of a radar ADAS system. System 10 may additionally provide instructions regarding placement of such targets about the vehicle, such as distances from the vehicle, such as in front of, behind or to the lateral sides of the vehicle. System 10 may additionally provide instructions regarding other requirements needed for calibration, such as with regard to special lights, a level condition of the floor.

In a particular embodiment, the repair recommendation report 18 provided to the mechanic via diagnostic tool 28 outputs not only service information, but also lists the safety systems detected, required vehicle calibrations for specific safety systems in that vehicle based on the damage area or electronic detection (either detecting codes or not detecting an ECU that is expected), list of ADAS targets required for those system calibrations, and an estimate of the time it takes to perform the calibrations. The repair recommendation report 18 may also identify any special service tools required to perform the vehicle repairs, including tools required for repairing vehicle safety systems and calibrations for such systems.

Although database 50*b* is disclosed above as residing in diagnostic tool 28, such a database may additionally or alternatively reside in the memory of a remote computer, such as a remote server 64. If the database is located in a remote server 64, the vehicle interface tool 28 may access the database via an Internet interface. Optionally, the database, such as a database found on the remote computer or server 64, may be a compiled database of VINs and/or ECUs provided by a third party. Still further, the database found in the memory of the vehicle interface tool 28 may be a local database that comprises a portion of the information, where the database found on the remote computer or server 64 is remote and contains additional or alternative information. For example, the database may be progressively expanded to include those VINs and/or associated ECU part numbers for vehicles previously serviced at a particular service station or automotive repair business. Optionally, the database may be updated, such that an operator may add a new vehicle VIN and associated ECU part numbers. The database may thus be a tool for identifying which vehicles are equipped with ADAS subsystems.

Diagnostic tool 28 may, either in addition to the above noted various loaded diagnostic applications or in place thereof, be used to access remotely located diagnostic applications, such as that may reside on remotely located servers 64. This may be done, for example, to avoid the need for obtaining and locally storing and maintaining diagnostic applications on diagnostic tool 28. In the illustrated embodiment, diagnostic tool 28 includes an input/output (I/O) interface 66 for coupling to peripheral devices, such as one or more of a monitor, keyboard, mouse, and the like. In a further illustrated embodiment, the diagnostic tool 28 is implemented as a laptop computer with integrated monitor, keyboard, and mouse.

Figure 4:
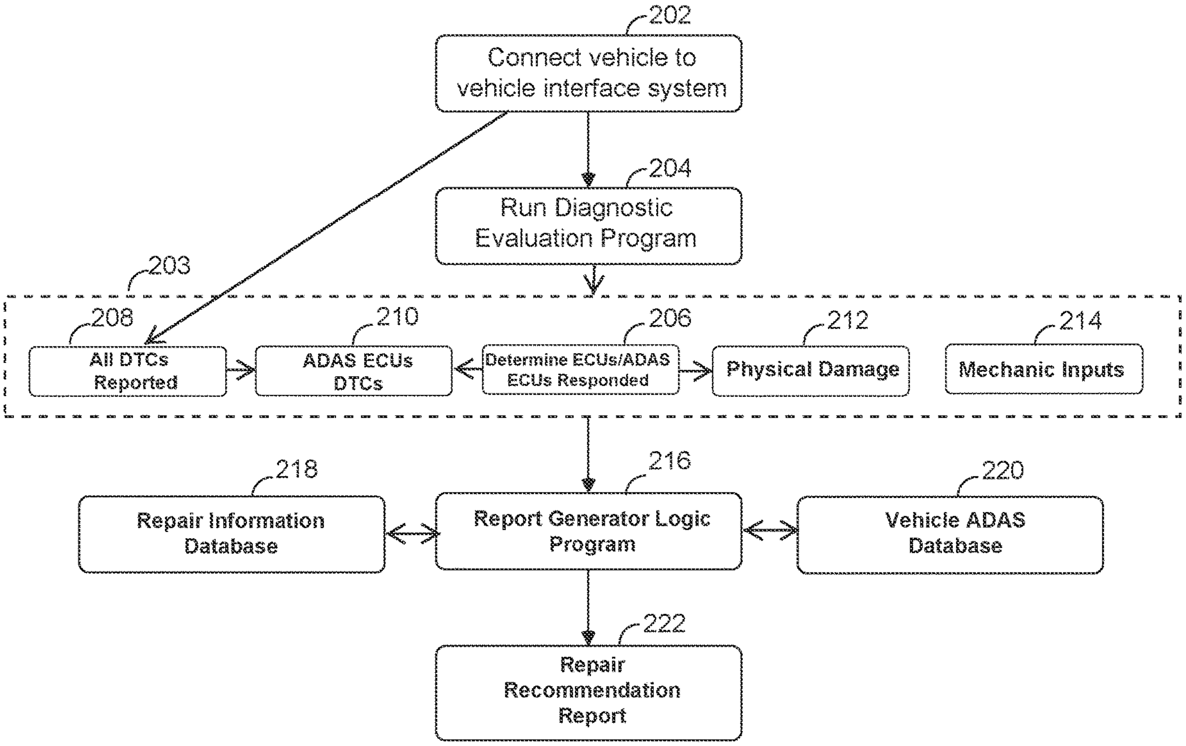
FIG. 4 is a flow diagram illustrating the information and databases utilized by the vehicle diagnostic tool of FIG. 1 to provide a user with reports for servicing the vehicle.

A method for providing a repair recommendation report in accordance with aspects of the present invention is illustrated in FIG. 4. In step 202 of FIG. 4, a vehicle 22 to be evaluated is communicatively coupled to a vehicle diagnostic tool 28 via a vehicle cable 42, as part of the step 203 of acquiring repair data inputs. In step 204 of FIG. 2, a diagnostic evaluation program 51 is run to acquire vehicle data information, as illustrated in step 206, such as to determine the ADAS ECUs on vehicle 22 that respond to signal inquiries sent from diagnostic tool 28 for determining the presence of such ECUs. The step 206 may include determining all ECUs present on vehicle 22, with subsequent filtering to ADAS ECUs based on known addresses and/or part numbers of the ADAS ECUs, or may merely seek to determine the presence of ADAS ECUs. Step 208 of FIG. 4 illustrates the obtaining of reported DTCs from electronic system 23 via diagnostic tool 28. Step 210, in turn, illustrates the determination of DTCs reported by ADAS ECUs, which can be determined based on a correlation between all reported DTCs determined at step 208 and the determined ADAS ECUs present on vehicle 22 from step 206 obtained via diagnostic evaluation program 51. In step 212 physical damage inputs regarding any damage to vehicle 22 are provided to system 10, such as via images of vehicle 22 and use of image recognition software, or via a separate collision repair estimating software, or via inputs by a mechanic 24. The method may further include obtaining inputs from a mechanic at step 214, such as inputs other than related to any damage to vehicle 22.

In step 216 of FIG. 4, a report generator logic program is used to generate repair recommendation reports as shown at step 222, where to do so the report generator logic program accesses a repair information database at step 218 and a vehicle ADAS database at step 220 and utilizes the repair data inputs from step 203 to compile the repair recommendation reports. The repair recommendation reports may include a recommended scanning program to be used with the vehicle 22, including based on the determination of the ADAS systems present on vehicle 22.

System 10, in addition to performing scanning operations, may also be used for reprogramming of vehicle 22, such as reprogramming selected ECUs, including reprogramming ECUs based on a determination of particular fault codes.

Although vehicle interface diagnostic tool 28 is discussed above as conforming with the SAE J2534 standard, it should be appreciated that alternatively configured vehicle diagnostic and programming tools may be employed within the scope of the present invention, including alternatively configured tools for alternative types of vehicles, such as alternative classes of vehicles. Accordingly, an interface tool may conform with the ISO 22900 standard, or RP1210 standard, or may operate under the ELM327 command protocol.

As noted, the software and/or hardware of diagnostic and programming tools may be required to be updated to operate with new vehicles and/or enable programming and diagnosing of existing vehicles. In the above noted embodiments the vehicle interface diagnostic tool 28 may be periodically updated via an Internet connection, or may be returned to the supplier for updating, including with regard to hardware updates. This may be done by the supplier of the vehicle interface diagnostic tool 28 whereby the local operator 24 need not spend time attempting to maintain the equipment.

In the illustrated embodiment vehicle interface diagnostic tool 28 is disclosed as including both the diagnostic evaluation program 51 as well as multiple diagnostic scanning programs 53*a*, 53*b*. It should be appreciated that alternative arrangements may be employed within the scope of the present invention. For example, program 51 and/or programs 53*a*, 53*b* may reside on different devices. For example, an operator 24 may first utilize one device with a diagnostic evaluation program 51 to determine which diagnostic evaluation program is appropriate for the vehicle 22, and then select from alternative computer devices to run the determined diagnostic evaluation program. Still further, although diagnostic evaluation program 51 and diagnostic scanning programs 53*a*, 53*b* are illustrated and discussed herein as being separate programs, one or more of such programs may be combined together and operate as subroutines.

The vehicle interface tool 28 may be used to scan ECUs of a vehicle under test for error codes while using a scanning program that performs a minimum number of ECU queries possible, while also querying any ADAS ECUs in the vehicle. Less costly and faster scanning programs, such as third-party supplied scanning programs may be used instead of a manufacturer supplied scanning program when, for example, there are no ADAS ECUs in the vehicle under test. A manufacturer supplied scanning program may be used, however, when the vehicle under test includes ADAS ECUs to insure an in-depth scanning of the electrical system 23 of the vehicle 22. Thus, when appropriate, a vehicle under test may be scanned for ECU error codes using a more efficient and minimally expensive with respect to monetary cost and test duration scanning program that queries/scans a substantial majority of the vehicle's ECUs.

Figure 6:
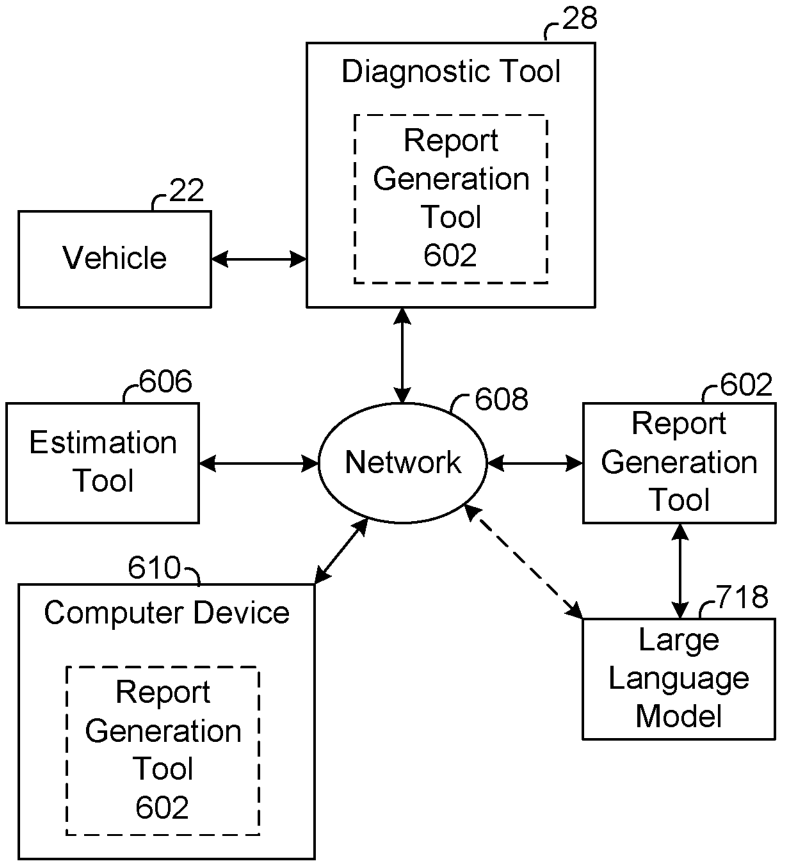
FIG. 6 is a block diagram of a vehicle diagnostic system that includes an exemplary report generator for generating reports based on vehicle information and scan reports in accordance with an aspect of the present invention.
Figure 7:
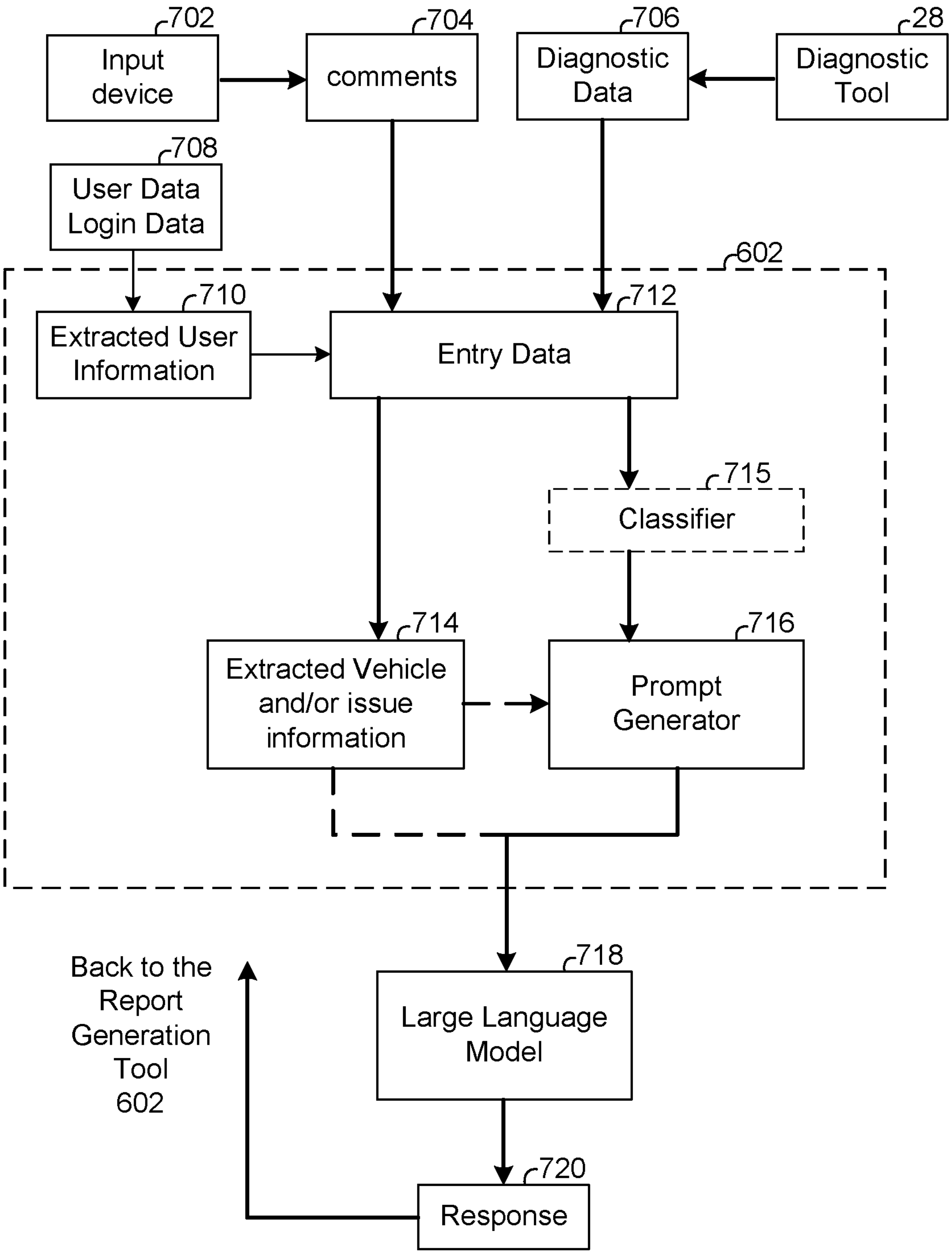
FIG. 7 is a block diagram of an exemplary AI analytical assist system for generating repair/service reports in accordance with an aspect of the present invention.
Figure 8:
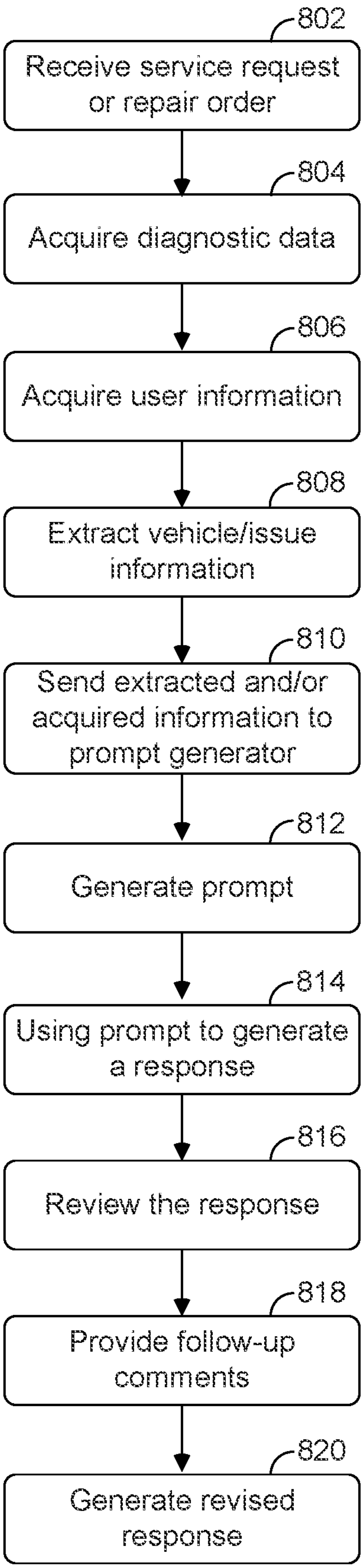
FIG. 8 is a flow diagram illustrating the steps to a method for generating a pre-repair report with a repair/service plan for a vehicle in accordance with an aspect of the present invention.

Referring to FIGS. 6-8, the vehicle diagnostic system 10 can be configured to be selectively operable in one of a plurality of different modes, whereby a technician can use the diagnostic tool 28 for vehicle maintenance, diagnosis, programming, estimate/invoice report generation, and repair as needed. In accordance with an embodiment of the present invention, the system includes an exemplary report generation tool 602 for generating a pre-repair report 720 for vehicles (i.e., vehicle 22). Such a pre-repair report 720 can be based upon the ADAS reports discussed herein. The pre-repair report 720 can be used, for example, as an input to estimating software, such as estimation tool 606 (implemented on a computer device or via cloud computing resources). As described herein, the pre-repair report 720 can be used to guide the estimation tool 606 in generating a repair plan. The repair plan includes (or generates) a list of calibrations required on the vehicle, repair procedures, and justifications. When the estimate is created, it lists all of these calibrations and other items that have a cost or labor associated with them.

The pre-repair report 720 can be generated based on any of vehicle estimate repair line items, diagnostic trouble codes scanned from a vehicle diagnostic tool 28 coupled to a vehicle 22, associated repair and service information, notes from technicians or customers describing the problem(s), vehicle build information, and information concerning equipped ADAS systems, service information, OEM target lists, and repair recommendations. As also described herein, the exemplary pre-repair report 720 can include information useful for generating a repair plan. For example, the pre-repair report 720 can include sections describing why repairs need to be made, what repairs are recommended or required, how those repairs should be carried out, and differences between mechanical repair/service issues versus collision-based repair/service issues. In one embodiment, the report generation tool 602 includes (or accesses) a large language model 718, which receives the inputs to the report generation tool 602 (as well as those inputs generated or extracted by the report generation tool 602 from the input data) and uses them as a prompt to generate a desired response (i.e., the pre-repair report 720). This response (the pre-repair report) 720 is received by the report generation tool 602. As described herein, additional inputs to the LLM 718 (e.g., after the response or pre-repair report 720 has been generated) can be used by the LLM 718 to refine or adjust the response or pre-repair report 720 (with the LLM 718 outputting an updated or revised pre-repair report 722) (see FIGS. 7, 7A, and 7B). Note that the response from the LLM 718 can be received by the report generation tool 602 and either used as the pre-repair report or used to generate the pre-repair report. In an aspect of the present embodiment, the LLM 718 is a part of the report generation tool 602. In an alternative embodiment, the LLM 718 outputs a response (the pre-repair report) 720 to the report generation tool 602.

The report generation tool 602 can, for example, be implemented with a variety of hardware and software that make up one or more computer systems or servers, such as operating in a network, comprising hardware and software, including one or more programs, such as cooperatively interoperating programs (e.g., a large language model 718). For example, an exemplary embodiment can include hardware, such as, one or more processors configured to read and execute software programs. Such programs (and any associated data) can be stored and/or retrieved from one or more storage devices. The hardware can also include power supplies, network devices, communications devices, and input/output devices, such devices for communicating with local and remote resources and/or other computer systems. Such embodiments can include one or more computer systems and are optionally communicatively coupled to one or more additional computer systems that are local or remotely accessed. Certain computer components of the exemplary embodiments can be implemented with local resources and systems, remote or "cloud" based systems, or a combination of local and remote resources and systems. The software executed by the computer systems of the exemplary embodiments can include or access one or more algorithms for guiding or controlling the execution of computer implemented processes in the vehicle diagnostic system 10. As discussed herein, such algorithms define the selection of user data, vehicle information, and associated vehicle issue information, the generation of a prompt, and the LLM's generation of a pre-repair report as defined by that prompt.

As illustrated in FIG. 6, a vehicle diagnostic tool 28 communicatively coupled to the electronic systems (e.g., the ECUs) of a vehicle 22, is also communicatively coupled to the report generation tool 602 via a network connection 608. Note that the large language model or LLM 718 is either a part of the report generation tool 602 or accessed by the report generation tool 602. In one embodiment, the network connection 608 is a connection to the Internet 70, such that the report generation tool 602 is implemented via cloud computing resources or via a remote computer or other hardware and software resources. Alternatively, the network connection 608 is a local network with the report generation tool 602 implemented in a local computer device. In another alternative embodiment, the network connection 608 can provide access to a local network and to the Internet 70, such that resources accessed by the vehicle diagnostic tool 28 can be locally located and/or remotely located. As also illustrated in FIG. 6, the estimation tool 606 is accessed via the network connection 608. Thus, components of the system can intercommunicate with other components via a local network connection 608 and/or a network connection 70 (see FIGS. 2 and 6). As described herein, when the LLM 718 is implemented as a separate component from the report generation tool 602, the LLM 718 can be local with respect to the report generation tool 602 or accessed via an Internet connection (e.g., Internet connection 70) as a remote tool implemented as part of a remote computer or via cloud computing resources.

Referring to FIG. 6, the report generation tool 602 can be implemented either as part of a remote computer or via cloud computing resources, or as a part of the diagnostic tool 28 or the computer device 610. As discussed above, the LLM 718 can be can be implemented either as a part of the report generation tool 602 or accessed by the report generation tool 602 (FIG. 6).

As noted herein, the vehicle diagnostic system 10 determines whether particular electrical vehicle systems (e.g., ECUs) are present in the vehicle 22 and whether any of these electrical vehicle systems are Advanced Driver Assistance Systems (ADAS) systems (with their particular ECUs). With the list of ADAS systems present in the vehicle 22, an ADAS report is created. As discussed herein, the ADAS report is used in the generation of the pre-repair report.

In an aspect of the exemplary embodiment, the LLM 718 is configured to receive a variety of inputs that are used to define a "prompt" that is provided to the LLM 718. In one exemplary embodiment, an exemplary large language model can be implemented as part of an analytical system that is configured to receive data from user input, diagnostic data from the vehicle diagnostic tool 28, and vehicle information from various sources. The analytical system can be described as machine learning artificial intelligence (AI) processes that include or utilize large language models. In one embodiment, the vehicle diagnostic tool 28 can access the LLM 718 via an API tailored to access and facilitate the passing of inputs (and a system prompt) to the LLM 718. While FIG. 6 illustrates a vehicle diagnostic tool 28 accessing the network connection 608, to for example, access the report generation tool 602 and/or the large language model 718, other computer devices (e.g., computer device 610) may also be used to access the report generation tool 602 and/or the LLM 718. The computer device 610 may include portable computing devices (used by individuals, e.g., operator/mechanic 24), a computer station or terminal (used by a service provider or individuals, e.g., operator/mechanic 24).

With the use of these diverse data sources, a prompt is defined for the large language model (LLM) 718. Using this prompt, and optional extracted vehicle information and issue and/or damage information, the LLM 718 responses with a context sensitive response (pre-repair report) 720. The pre-repair report 720 is defined by the prompt, vehicle information, and issue/damage information, and can be further tailored via user inputs to the LLM 718, such that the LLM 718 can produce a revised response or pre-repair report 720 that incorporates or responds to the user input. Because the best and most relevant response from the LLM 718 is dependent upon the quality of the prompt given to the LLM 718, the exemplary embodiments provide a prompt to the LLM 718 that is defined by user information, vehicle information (including ADAS system information), diagnostic information, issue/repair information, and user input. As described herein, a highly relevant response 720 from the LLM 718 is a pre-repair report 720 which can be used, for example, to guide an estimator into developing or building a repair plan. A system and methods for generating a highly relevant system prompt to a large language model to generate a highly relevant response by the large language model may be configured substantially in accordance with the cognitive assistance models of U.S. patent application Ser. No. 63/501,648 ("the '648 patent application"), which is hereby incorporated herein by reference in its entirety.

Referring to FIG. 7, an exemplary report generation tool 602 receives entry data 712 that is received from an input device 702 supplying comments or textual inputs 704, as well as from a diagnostic tool 28 capturing and providing diagnostic data 706 (e.g., scan reports and other diagnostic information). The entry data 712 also includes user information 710, which is extracted from user data and login data 708. In one exemplary embodiment, the user/login data 708 can be used to provide some contextual information for the type of pre-repair or service report. For example, based on the user information, the pre-repair report can be tailored to the recipient. If the user or recipient is a repair technician, then the report will include more details on how to perform the repairs. If the user or recipient is an estimator, the report will have more detail on what parts, labor, calibrations, and other materials must be put into the repair estimate. If the user is an insurance adjuster or an end customer, the report will show justification(s) for why the report is needed. The comments 704 can also include repair and/or service information, and notes from a technician or customer describing the problem. As also illustrated in FIG. 7, vehicle and/or issue information 714 can be extracted from the entry data 712. The user information 710 and/or the diagnostic data 706 can include OEM proprietary information concerning the vehicle 22 (e.g., a database of ADAS systems, service information, OEM target lists, and repair recommendations). Exemplary vehicle/issue information 714 can include any of a vehicle make, model, VIN, lists of systems found in the vehicle (e.g., ADAS systems), scan reports, and user reports concerning collision/mechanical issue information, etc. Thus, the entry data 712 provides any of the following data types and sources: vehicle estimate repair line items from an estimate (from the estimation tool 606), diagnostic trouble codes (DTCs) scanned from the vehicle 22 by a diagnostic tool 28, repair and/or service information, textual notes from a technician or customer describing the problem, vehicle build information (make, model, year, VIN, system list, etc.), and access to (or a summarization of) proprietary information, e.g., a database of ADAS systems (of vehicle 22), service information, OEM target lists, and repair recommendations). A system and methods for extracting of user information and vehicle/subsystem information may be configured substantially in accordance with the automotive repair search engine systems of U.S. patent application Ser. No. 17/977,153 ("the '153 patent application"), which is hereby incorporated herein by reference in its entirety. Lastly, a prompt generator 716, using the entry data 712, generates a relevant prompt for the LLM 718. The extracted vehicle/issue information 714 is also provided to the prompt generator 716. Alternatively, the extract vehicle/issue information 714 may be separately provided to the LLM 718 (see FIG. 7). Responding to a prompt, the LLM 718 will produce a response 720. Using the entry data 712, the prompt generator 716 is configured to generate a relevant prompt that will be used to produce a response (the pre-repair report) 720 from the LLM 718. A system and methods for generating or selecting a prompt for an LLM may be configured substantially in accordance with the automotive-oriented AI analytical data query assist systems of U.S. provisional patent application Ser. No. 63/501,648 ("the '648 patent application") (DRE01 P-140), which is hereby incorporated herein by reference in its entirety. As discussed herein, the response 720 is returned to the report generation tool 602 for later review by the user and possible update and revision (see FIG. 7B).

In an alternative embodiment, as illustrated in FIG. 7 and discussed in detail in the '648 patent application, the report generation tool 602 may utilize a classifier 715. An exemplary classifier 715 receives the entry data 712 and selects a classification to be sent to the prompt generator 716. The classifier 715 can make an initial determination or evaluation of the entry data in the form of a categorical description related to the user information, vehicle information, and diagnostic information. Because the classification is based upon both the entry data and the user information, the report will be tailored to the user or intended recipient. Thus, the prompt generator 716 generates or selects a prompt for the LLM 718 based upon the selected classification from the classifier 715 (as well as the extracted vehicle and/or issue information.

Figure 7A:
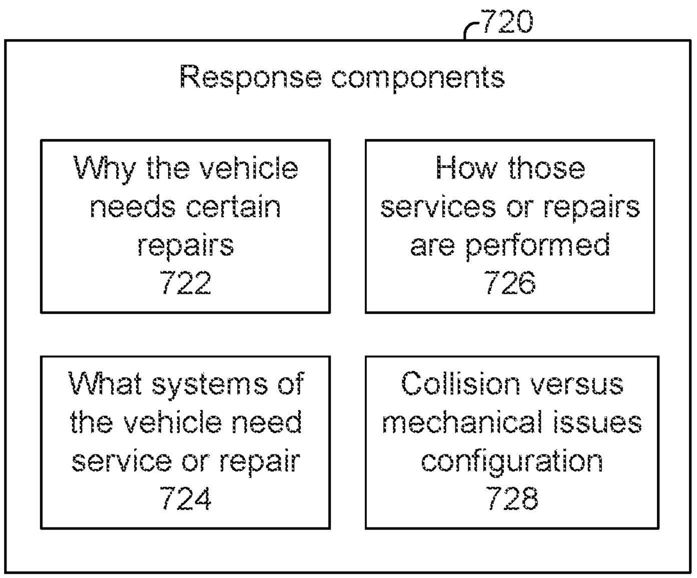
FIG. 7A is a block diagram of an exemplary response of FIG. 7 and illustrating exemplary components of the response in an aspect of the present invention.

Referring to FIG. 7A, an exemplary response 720 includes one or more of the following components: why the vehicle needs certain repairs 722 (the "why section"), what systems of the vehicle need service or repair 724 (the "what section"), how those services or repairs are performed 726 (the "how section"), and a consideration of services provided for a collision versus mechanical issues 728 (the "collision vs. mechanical section"). For example, the why section 722 of the response 720 will provide information with respect to why the vehicle (e.g., vehicle 22) needs certain repairs. The why section 722 can also be designed for the use of an insurance company or the customer. In one embodiment, the why section 722 includes a "simplified" description of the problem/issue and solutions and makes reference to OEM service information recommendations (e.g., the front radar needs to be calibrated because the Toyota service information states anytime a bumper is removed the calibration is required). The what section 724 includes a list of the systems that are on the vehicle and what calibrations and/or service actions are required for those systems. The what section 724 also presents a list of expected diagnostic repairs and a probability scoring. An exemplary probability score is based on the data consumed and will provide a likely list of different repairs/calibrations that may be needed and the probability of such. The how section 726 presents a list of how those service actions (from the what section 724) are performed. For example, a shortened summary of the service and repair information that is presented to a technician, with the shortened summary still providing enough detail that the service procedure(s) can be understood. This summary can be adjusted based upon the recipient of the response 720. Lastly, in the collision vs. mechanical section 728, the type of repair or service and its origin (collision versus mechanical issues) is considered. For example, in a collision, diagnostic trend data is not very useful because a vehicle can be hit anywhere or have any type of damage. In a mechanical repair, the diagnostic trend data is useful because of pattern failures. The system will determine if it's a collision or mechanical repair and enable or disable the analysis of diagnostic trend data related to pattern failures. In one embodiment, part of the input data will identify the type of repair/service (collision versus mechanical issues). Alternatively, the LLM 718 will determine the type of repair/service based on the input data.

Figure 7B:
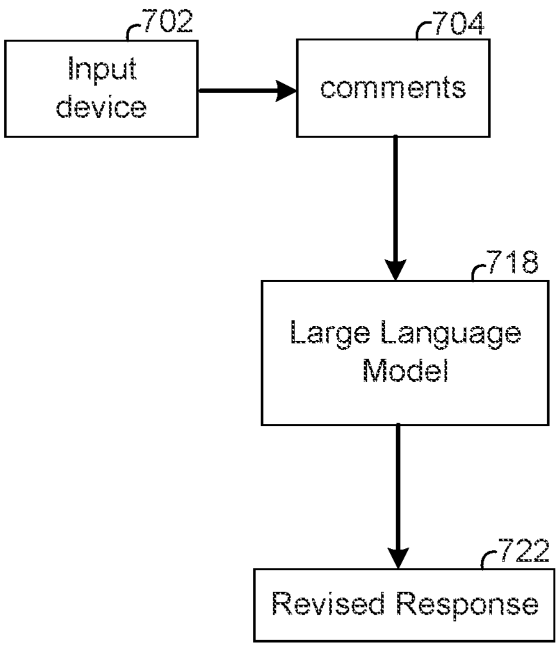
FIG. 7B is a block diagram of the large language model of FIG. 7 and illustrating user generated comments input to the large language model for generating a revised response in an aspect of the present invention.

Referring to FIG. 7B, after the LLM 718 responds with a response (the pre-repair report) 720, the recipient is able to reply to the LLM 718 via an input device 702, with the resulting comments 704 extracted from any text message or reply from the recipient used as an additional input to the LLM 718. Such comments 704 can include additional information or corrections to the original information (e.g., diagnostic data, user data, vehicle/issue data, and additional details from the customer and/or technician with regards to the vehicle's problems) that was used by the prompt generator 716 to generate the prompt used by the LLM 718 to generate the response (the pre-repair report) 720. Based upon this additional or corrective informational input, the LLM 718 can revise the response (the pre-repair report) 720 and generate a revised response 722 as a revised pre-repair report. As discussed herein, the pre-repair report 720 includes a why section 722 that aims to explain to a particular recipient why the repairs are necessary. By way of example, if the recipient is an insurance adjuster, the why section 722 will attempt to explain the necessity of each calibration, primarily to help insurers understand the justification for each procedure. If the why section 722 is missing either one of the required calibration procedures or related procedures, these can be added such that their reason for being performed is included in the why section 722. That is, a review of the vehicle's ECUs can be used to insure that all required calibrations and service procedures (and their requirements and rationales) are included in the why section 722. Such additions could also result in revisions to the other sections, e.g., the what section 724, and the how section 724.

Referring to FIG. 8, a method for generating a pre-repair report is illustrated. In step 802 of FIG. 8, a service request or repair request for a particular vehicle (e.g., vehicle 22) is received. In step 804 of FIG. 8, diagnostic data from the vehicle is acquired. In an aspect of the present embodiment, a vehicle diagnostic tool 28 is used to query the electronic systems of the vehicle 22. In step 806 of FIG. 8, user information is acquired. Such user information is used to provide context for the requested pre-repair report (i.e., who's asking for the report). For example, the user information may be extracted from the user login data on the vehicle diagnostic tool 28 or via a computer device's login data (i.e., such computer device may provide the comments 704 via the input device 702 (see FIG. 7). In step 808 of FIG. 8, vehicle and issue information is extracted from the diagnostic data, the user information, and comments provided by the user (e.g., a technician, and/or the customer) concerning the vehicle's problems (collision details and/or mechanical issues). In step 810 of FIG. 8, the extracted or acquired information is forwarded to the prompt generator 716. In step 812 of FIG. 8, the prompt generator 716 generates a prompt which is delivered to the large language model (LLM) 718. In step 814 of FIG. 8, the LLM 718 uses the prompt to generate a response (the pre-repair report) 720. In step 816 of FIG. 8, the response (pre-repair report) 720 is reviewed. In step 818 of FIG. 8, follow-up comments are provided to the LLM 718. In step 820 of FIG. 8, using the follow-up comments, the LLM 718 generates a revised or updated response 722 (a revised pre-repair report).

Thus, a vehicle diagnostic system can include an exemplary report generation tool for generating a pre-repair report for vehicles. The report generation tool includes or accesses a large language model (LLM) for generating the pre-repair report which can be used to guide the creation of a repair plan (such as provided by an estimation tool). The pre-repair report can be generated based on any of vehicle estimate repair line items, scan data, diagnostic data, associated repair and service information, notes from technicians or customers describing the problem(s), vehicle build information, and information concerning equipped ADAS systems, service information, OEM target lists, and repair recommendations. These informational sources are used to define a prompt for the LLM. After reviewing an initial response from the LLM (the pre-repair report), the user (e.g., technician or customer) can input additional information to guide the LLM in producing a revised report as a revised pre-repair report.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of generating a pre-repair report for a vehicle that provides information regarding repairs needed on the vehicle, said method comprising:

providing a vehicle diagnostic system comprising a computer device and a report generation tool;

receiving with the computer device vehicle and/or issue information related to the vehicle;

providing the vehicle/issue information to the report generation tool;

generating with the report generation tool a prompt for a large language model based on the vehicle/issue information; and generating an electronic pre-repair report with the large language model as defined by the prompt, wherein the pre-repair report includes (i) an identification of particular repairs expected to be required on the vehicle, (ii) original equipment manufacturer (OEM) service information regarding why the particular expected repairs are required, (iii) a list of systems on the vehicle requiring calibration after performance of the expected repairs, and (iv) repair service information for how to perform the particular expected repairs.

2. The method of claim 1, wherein the computer device and the report generation tool are communicatively coupled via a network, and wherein the network is one of a local network or the Internet.

3. The method of claim 1, further comprising determining with the vehicle diagnostic system whether particular Advanced Driver Assistance Systems (ADAS) systems are present on the vehicle, and wherein the vehicle/issue information includes an identification of the particular ADAS systems present on the vehicle.

4. The method of claim 1, wherein the report generation tool is communicatively coupled to the large language model.

5. The method of claim 1, wherein the report generation tool comprises the large language model.

6. The method of claim 1, wherein the vehicle/issue information comprises at least one of: vehicle make, vehicle model, VIN, a list of systems equipped on vehicle, diagnostic scan reports of an electrical system of the vehicle, and an electronic note describing a problem with the vehicle.

7. The method of claim 1, wherein the computer device is a vehicle diagnostic tool configured to communicatively couple to the vehicle and read data information of the vehicle.

8. The method of claim 1, wherein the vehicle/issue information includes user information, and wherein the pre-repair report is formatted with respect to the user information such that the pre-repair report provides context sensitive information for a user as defined by the user information.

9. A vehicle diagnostic system for generating a pre-repair report for a vehicle, the system comprising:

a computer device configured to receive vehicle and issue information comprising vehicle information, and/or issue information related to the vehicle; and a report generation tool communicatively coupled to the computer device;

wherein the computer device is configured to provide the vehicle/issue information to the report generation tool;

wherein the report generation tool is configured to generate a prompt for a large language model based on the vehicle/issue information;

wherein the large language model is configured to generate a pre-repair report as defined by the prompt, wherein the pre-repair report includes (i) an identification of particular repairs expected to be required on the vehicle, (ii) original equipment manufacturer (OEM) service information regarding why the particular expected repairs are required, (iii) a list of systems on the vehicle requiring calibration after performance of the expected repairs, and (iv) repair service information for how to perform the particular expected repairs.

10. The vehicle diagnostic system of claim 9, wherein the computer device and the report generation tool are communicatively coupled via a network, and wherein the network is one of a local network or the Internet.

11. The vehicle diagnostic system of claim 9, wherein the vehicle diagnostic system is configured to determine via said computer device whether particular Advanced Driver Assistance Systems (ADAS) systems are present on the vehicle, and wherein the vehicle/issue information includes an identification of the particular ADAS systems present on the vehicle.

12. The vehicle diagnostic system of claim 9, wherein the report generation tool is communicatively coupled to the large language model.

13. The vehicle diagnostic system of claim 9, wherein the report generation tool comprises the large language model.

14. The vehicle diagnostic system of claim 9, wherein the vehicle/issue information comprises at least one of: vehicle make, vehicle model, VIN, a list of systems equipped on the vehicle, diagnostic scan reports of an electrical system of the vehicle, and an electronic note describing a problem with the vehicle.

15. The vehicle diagnostic system of claim 9, wherein the computer device is a vehicle diagnostic tool configured to communicatively couple to the vehicle and read data information of the vehicle.

16. The vehicle diagnostic system of claim 9, wherein the vehicle/issue information includes user information, and wherein the vehicle diagnostic system is configured to format the pre-repair report with respect to the user information such that the pre-repair report provides context sensitive information for a user as defined by the user information.

17. The vehicle diagnostic system of claim 9, wherein the computer device is configured to display the pre-repair report to a user for review, and wherein the vehicle diagnostic system further comprises an input device configured to allow the user to input additional vehicle/issue information, and wherein the computer device is configured to provide the additional vehicle/issue information to the report generation tool, and wherein the report generation tool is configured to generate a revised prompt for the large language model based on the additional vehicle/issue information, and wherein the large language model is configured to generate a revised pre-repair report as defined by the revised prompt.

18. The vehicle diagnostic system of claim 9, wherein the large language model is configured to generate a probability estimate of the likelihood of each of the identified particular repairs being required.

19. The method of claim 1 further comprising:

displaying the pre-repair report via the computer device to a user for review;

receiving input with the computer device from the user wherein the input comprises additional vehicle/issue information;

providing the additional vehicle/issue information to the report generation tool;

generating with the report generation tool a revised prompt for the large language model based on the additional vehicle/issue information; and generating a revised pre-repair report with the large language model as defined by the revised prompt.

20. The method of claim 1, wherein said generating an electronic pre-repair report with the large language model further comprises generating a probability estimate of the likelihood of each of the identified particular pairs being required.

21. The method of claim 3, wherein said determining with the vehicle diagnostic system whether particular ADAS systems are present on the vehicle comprises operatively connecting the vehicle diagnostic system to be in communication with an electronic system of the vehicle and reading vehicle data information with the vehicle diagnostic system; and wherein said providing the vehicle/issue information to the report generation tool comprises providing the vehicle data information to the report generation tool.

* * * * *